US010901421B2

(12) United States Patent
Ning et al.

(10) Patent No.: US 10,901,421 B2
(45) Date of Patent: Jan. 26, 2021

(54) METHOD AND DEVICE FOR DETECTING ROAD BOUNDARY

(71) Applicants: Neusoft Corporation, Shenyang (CN); Neusoft Reach Automotive Technology (Shanghai) Co., Ltd., Shanghai (CN)

(72) Inventors: Zuotao Ning, Shenyang (CN); Wei Liu, Shenyang (CN); Wei Liu, Shenyang (CN)

(73) Assignee: NEUSOFT REACH AUTOMOTIVE TECHNOLOGY (SHANGHAI) CO., LTD., Shanghai (CN)

( * ) Notice: Subject to any disclaimer, the term of this patent is extended or adjusted under 35 U.S.C. 154(b) by 215 days.

(21) Appl. No.: 16/125,674

(22) Filed: Sep. 8, 2018

(65) Prior Publication Data
US 2019/0391583 A1    Dec. 26, 2019

(30) Foreign Application Priority Data

Jun. 26, 2018  (CN) .......................... 2018 1 0673126

(51) Int. Cl.
*G05D 1/02*    (2020.01)
*G01S 13/931*  (2020.01)
*G01S 13/42*   (2006.01)

(52) U.S. Cl.
CPC .............. *G05D 1/021* (2013.01); *G01S 13/42* (2013.01); *G01S 13/931* (2013.01); *G01S 2013/9323* (2020.01); *G05D 2201/0213* (2013.01)

(58) Field of Classification Search
CPC ............ G05D 1/021; G05D 2201/0213; G01S 2013/9323; G01S 13/42; G01S 13/931;
(Continued)

(56) References Cited

U.S. PATENT DOCUMENTS

2013/0293717 A1* 11/2013 Zhang ................ G06K 9/00798
                                                                348/149
2016/0011594 A1    1/2016 Chung et al.
(Continued)

FOREIGN PATENT DOCUMENTS

CN    105069415 A    11/2015
CN    105551082 A     5/2016
(Continued)

OTHER PUBLICATIONS

German First Office Action dated Jan. 21, 2019 in the corresponding German application(application No. 102018124108.9).
(Continued)

*Primary Examiner* — Nga X Nguyen
(74) *Attorney, Agent, or Firm* — Kilpatrick Townsend & Stockton LLP

(57) ABSTRACT

A method and a device for detecting a road boundary are provided. The method includes: sending, at a current detection moment, multiple detection beams to a road where a target vehicle is located by using a detection device installed on the target vehicle; obtaining echo signals of the detection beams reflected by the road; determining target coordinates of detection points on the road corresponding to the detection beams in the same coordinate system based on the echo signals of the detection beams; and determining a road boundary on the road based on the target coordinates of the detection points.

11 Claims, 12 Drawing Sheets

(58) Field of Classification Search
CPC ..... G01S 2013/93271; G01S 2013/932; G01S 7/2955; G01S 7/415; G01S 13/726; G01S 13/89; G01S 7/4808; G01S 17/931; G01S 17/89; G01S 17/88; G08G 1/167; G06K 9/62

See application file for complete search history.

(56) References Cited

U.S. PATENT DOCUMENTS

| | | | |
|---|---|---|---|
| 2016/0026184 | A1 | 1/2016 | Stainvas Olshansky et al. |
| 2016/0245911 | A1* | 8/2016 | Wang ................ G01S 7/292 |
| 2017/0344022 | A1* | 11/2017 | Shima ................ G01S 7/415 |
| 2018/0284292 | A1 | 10/2018 | Ono et al. |

FOREIGN PATENT DOCUMENTS

| | | |
|---|---|---|
| CN | 106127113 A | 11/2016 |
| CN | 106842231 A | 6/2017 |
| CN | 107169464 A | 9/2017 |
| CN | 107272019 A | 10/2017 |
| CN | 107356933 A | 11/2017 |
| DE | 102009050505 A1 | 11/2010 |
| DE | 102016113808 A1 | 2/2017 |
| JP | 2002174684 A | 6/2002 |
| JP | 2016045507 A | 4/2016 |
| JP | 2017097479 A | 6/2017 |
| WO | 02101328 A1 | 12/2002 |

OTHER PUBLICATIONS

JP Office Action dated Jul. 24, 2019 in the corresponding JP application (application No. 2018-168990).
CN First Office Action dated Mar. 25, 2020 in the corresponding CN application(application No. 201810673126.3).
CN second office action dated Dec. 9, 2020 (corresponding to the CN application No. 201810673126.3).

* cited by examiner

X:Direction perpendicular to the traveling direction of the vehicle
Y:Traveling direction of the vehicle
Z:Direction perpendicular to the ground
O' :Origin of the detection coordinate system
P、M:Detection points
α:An angel between the sector formed by the detection beams and the ground

METHOD AND DEVICE FOR DETECTING ROAD BOUNDARY

The present application claims priority to Chinese Patent Application No. 201810673126.3, titled "METHOD AND DEVICE FOR DETECTING ROAD BOUNDARY", filed on Jun. 26, 2018 with the State Intellectual Property Office of People's Republic of China, which is incorporated herein by reference in its entirety.

FIELD

The present disclosure relates to the technical field of environmental perception, and particularly to a method and a device for detecting a road boundary.

BACKGROUND

In the research and development field of advanced assistance driving and automatic driving, an environmental perception technology is a very important branch, which can provide sufficient environmental information for the advanced assistance driving and the automatic driving, such that the driving behavior may be decided based on the environmental information, to control the vehicle to complete a driving task.

The road boundary may be detected by the environmental perception technology. However, in the case of a special road condition (such as a poor road condition) and bad weather (such as rain, snow, lack of light), the detection effect of the conventional method for detecting a road boundary may be affected.

SUMMARY

A method and a device for detecting a road boundary are provided according to embodiments of the disclosure, to realize accurate detection of a road boundary without influence of an outside condition.

A method for detecting a road boundary is provided according to an embodiment of the disclosure. The method includes: sending, at a current detection moment, multiple detection beams to a road where a target vehicle is located by using a detection device installed on the target vehicle; obtaining echo signals of the detection beams reflected by the road; determining target coordinates of detection points on the road corresponding to the detection beams in the same coordinate system based on the echo signals of the detection beams; and determining a road boundary on the road based on the target coordinates of the detection points.

In an embodiment, the determining target coordinates of detection points on the road corresponding to the detection beams in the same coordinate system includes: determining an initial coordinate of the detection point on the road corresponding to each of the detection beams, where the initial coordinate is a coordinate of the detection point in a detection coordinate system corresponding to the detection point, the detection coordinate system is a two dimensional coordinate system constructed on a plane where the detection beam corresponding to the detection point is located; and converting the initial coordinate to a coordinate in a three dimensional world coordinate system, to obtain the target coordinate.

In an embodiment, the determining a road boundary on the road based on the target coordinates of the detection points includes: determining a detection point located on a side road edge of the road among the detection points based on the target coordinates of the detection points; and determining the road boundary on the road based on a target coordinate of the detection point located on the side road edge.

In an embodiment, the side road edge is a left side road edge or a right side road edge, and the determining the road boundary on the road based on a target coordinate of the detection point located on the side road edge includes: determining the road boundary on the road based on the target coordinates of the detection points located on the side road edge, in case that the number of the detection points located on the side road edge is greater than or equal to three.

In an embodiment, the determining the road boundary on the road based on the target coordinates of the detection points located on the side road edge includes: taking at least three detection points located on the side road edge as road edge detection points; performing polynomial fitting based on the target coordinates of the road edge detection points, to obtain a fitting polynomial corresponding to the current detection moment; and generating road boundary information of the road based on the fitting polynomial corresponding to the current detection moment.

In an embodiment, the determining the road boundary on the road based on the target coordinates of the detection points located on the side road edge includes: taking at least three detection points located on the side road edge as road edge detection points; performing polynomial fitting based on the target coordinates of the road edge detection points, to obtain a fitting polynomial corresponding to the current detection moment; revising the fitting polynomial corresponding to the current detection moment based on a fitting polynomial corresponding to the last detection moment; and generating road boundary information of the road based on the revised fitting polynomial.

A device for detecting a road boundary is provided according to an embodiment of the disclosure. The device includes a beam sending unit, a signal obtaining unit, a coordinate determining unit and a boundary determining unit. The beam sending unit is configured to send, at a current detection moment, multiple detection beams to a road where a target vehicle is located by using a detection device installed on the target vehicle. The signal obtaining unit is configured to obtain echo signals of the detection beams reflected by the road. The coordinate determining unit is configured to determine target coordinates of detection points on the road corresponding to the detection beams in the same coordinate system based on the echo signals of the detection beams. The boundary determining unit is configured to determine a road boundary on the road based on the target coordinates of the detection points.

In an embodiment, the coordinate determining unit includes an initial coordinate determining subunit and a target coordinate determining subunit. The initial coordinate determining subunit is configured to determine an initial coordinate of the detection point on the road corresponding to each of the detection beams. The initial coordinate is a coordinate of the detection point in a detection coordinate system corresponding to the detection point, the detection coordinate system is a two dimensional coordinate system constructed on a plane where the detection beam corresponding to the detection point is located. The target coordinate determining subunit is configured to convert the initial coordinate to a coordinate in a three dimensional world coordinate system, to obtain the target coordinate.

In an embodiment, the boundary determining unit includes a road edge detection point determining subunit and a road boundary determining subunit. The road edge detection point determining subunit is configured to determine a detection point located on a side road edge of the road among the detection points based on the target coordinates of the detection points. The road boundary determining subunit is configured to determine the road boundary on the road based on a target coordinate of the detection point located on the side road edge.

In an embodiment, the side road edge is a left side road edge or a right side road edge, and the road boundary determining subunit is configured to: determine the road boundary on the road based on the target coordinates of the detection points located on the side road edge, in case that the number of the detection points located on the side road edge is greater than or equal to three.

In an embodiment, the road boundary determining subunit includes a first detection point determining subunit, a first polynomial determining subunit and a first boundary information determining subunit. The first detection point determining subunit is configured to take at least three detection points located on the side road edge as road edge detection points. The first polynomial determining subunit is configured to perform polynomial fitting based on the target coordinates of the road edge detection points, to obtain a fitting polynomial corresponding to the current detection moment. The first boundary information determining subunit is configured to generate road boundary information of the road based on the fitting polynomial corresponding to the current detection moment.

In an embodiment, the road boundary determining subunit includes a second detection point determining subunit, a second polynomial determining subunit, a polynomial revising subunit and a second boundary information determining subunit. The second detection point determining subunit is configured to take at least three detection points located on the side road edge as road edge detection points. The second polynomial determining subunit is configured to perform polynomial fitting based on the target coordinates of the road edge detection points, to obtain a fitting polynomial corresponding to the current detection moment. The polynomial revising subunit is configured to revise the fitting polynomial corresponding to the current detection moment based on a fitting polynomial corresponding to the last detection moment. The second boundary information determining subunit is configured to generate road boundary information of the road based on the revised fitting polynomial.

A device for detecting a road boundary is provided according to an embodiment of the disclosure. The device includes a processor, a memory and a system bus. The processor and the memory are connected by the system bus. The memory is configured to store one or more programs. The one or more programs include instructions, when executed by the processor, causing the processor to perform any one of the above methods.

A computer readable storage medium is provided according to an embodiment of the disclosure. The computer readable storage medium stores instructions, when executed on a terminal device, causing the terminal device to perform any one of the above methods.

A computer program product is provided according to an embodiment of the disclosure. The computer program product, when run on a terminal device, causes the terminal device to perform any one of the above methods.

In the method and the device for detecting a road boundary according to the present disclosure, multiple detection beams are sent, at a current detection moment, to a road where a target vehicle is located by using a detection device installed on the target vehicle, echo signals of the detection beams reflected by the road are obtained, target coordinates of detection points on the road corresponding to the detection beams in the same coordinate system are determined based on the echo signals of the detection beams, and a road boundary on the road is determined based on the target coordinates of the detection points. As can be seen that, according to the embodiments of the disclosure, the detection points on the road may be determined by using the detection device installed on the target vehicle, that is, the detection points may be determined without influence of outside conditions, such that the road boundary may be determined accurately based on the target coordinates of the detection points, to realize accurate detection of the road boundary.

BRIEF DESCRIPTION OF THE DRAWINGS

Embodiments of the disclosure are more clearly described by the drawings which are used in the illustration of the embodiments of the disclosure are described briefly.

DETAILED DESCRIPTION OF THE EMBODIMENTS

In order to understand the technical solution provided according to the present disclosure, the research background of the technical solution of the present disclosure is briefly introduced firstly hereinafter.

In recent years, with the rapid development of automobile industry, intelligent driving technology, such as advanced assistance driving and automatic driving, attracts more and more attention, and also attracts the attention of many automobile industry researchers. One of prerequisites of the intelligent driving technology, such as the advanced assistance driving and the automatic driving, is to detect road boundary information quickly and effectively, so that in a complex road environment, a passable area of a vehicle may be defined according to the road boundary information, to provide auxiliary information for navigation and route planning of the intelligent driving technology, and ensure the vehicle to travel within a region between right and left edges of the road. However, in the case of a special road condition (such as a poor road condition) and bad weather (such as rain, snow, lack of light), a detection effect of the conventional solution of detecting a road boundary is affected.

Therefore, a method for detecting a road boundary is provided according to the present disclosure, which can determine the road boundary accurately, to realize accurate detection of a road boundary without influence of outside conditions. The method is introduced in detail hereinafter.

Figure 1:
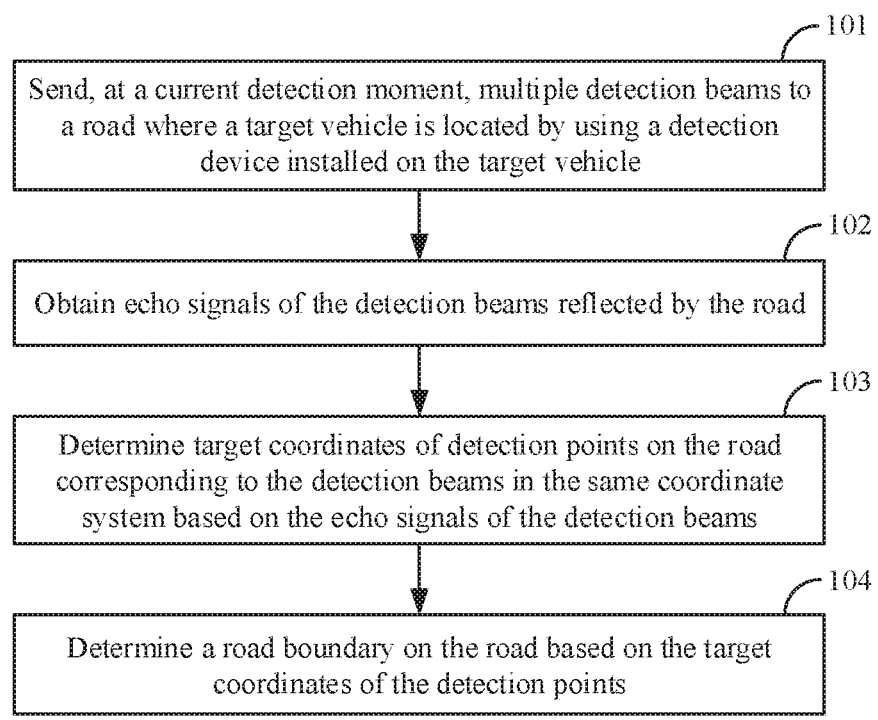
FIG. 1 is a flowchart of a method for detecting a road boundary according to an embodiment of the present disclosure.

FIG. 1 is a flowchart of a method for detecting a road boundary according to an embodiment of the present disclosure. As shown in FIG. 1, the method for detecting a road boundary includes following steps 101 to 104.

In step 101, multiple detection beams are sent, at a current detection moment, to a road where a target vehicle is located by using a detection device installed on the target vehicle.

In practice, any vehicle that uses the embodiment to realize road boundary detection may be defined as the target vehicle.

The detection device is installed on the target vehicle in advance. The detection device is a sensor which can output point cloud data, such as a laser radar sensor or a millimeter-wave radar sensor, or other equipment that is not belong to a radar sensor but has a detection function. The detection device may be installed at a location of the target vehicle depending on an actual situation. For example, the detection device may be installed at the head of the vehicle, to detect a road boundary in front of the vehicle for assistance driving and automatic driving.

It should be noted that, in the embodiment, when road boundary detection is performed, firstly, multiple detection beams are sent, at the current detection moment, to the road where the target vehicle is located by using the detection device installed on the target vehicle. Then the step 102 may be performed.

In step 102, echo signals of the detection beams reflected by the road are obtained.

In practice, after the multiple detection beams are sent to the road where the target vehicle is located in step 101, the echo signals of the detection beams reflected by the road may be obtained. The detection beams correspond to different echo signals.

It can be understood that, the multiple detection beams sent by the detection device in step 101 present as a sector. The detection beams are located at different layers in the sector area, and are sent to different detection points on the road. The detection beams are reflected by the detection points on the road to generate the echo signals. Therefore, different detection beams correspond to different echo signals and different detection points on the road.

In step 103, target coordinates of detection points on the road corresponding to the detection beams in the same coordinate system are determined based on the echo signals of the detection beams.

In practice, after the echo signals of the detection beams reflected by the road are obtained in step 102, the detection point on the road corresponding to each detection beam may be determined based on the obtained echo signal of the detection beam. The multiple detection beams sent by the detection device present as a sector, and the detection beams locate at different layers of the sector area, therefore, the detection points locate in different coordinate systems corresponding to the detection beams.

It may be understood that, the detection points locate in different coordinate systems corresponding to the detection beams, in order to detect the road boundary later, coordinate conversion should be performed on the coordinate of each detection point, such that the detection points may be projected into the same coordinate system, to determine the target coordinates of the detection points on the road corresponding to the detection beams in the same coordinate system. The target coordinates refer to coordinates in the same coordinate system after the coordinate conversion is performed on the coordinate of each of the detection points. The specific coordinate conversion mode is introduced in detail in subsequent embodiment. Furthermore, after the target coordinates of the detection points in the same coordinate system are determined, the step 104 may be performed.

In step 104, a road boundary on the road is determined based on the target coordinates of the detection points.

In the embodiment, after the target coordinates of the detection points on the road corresponding to the detection beams in the same coordinate system are determined in step 103, the road boundary on the road can be determined based on the target coordinates of the detection points.

From the above, in the method for detecting a road boundary according to the embodiment of the present disclosure, multiple detection beams are sent, at a current detection moment, to a road where a target vehicle is located by using a detection device installed on the target vehicle, echo signals of the detection beams reflected by the road are obtained, target coordinates of detection points on the road corresponding to the detection beams in the same coordinate system are determined based on the echo signals of the detection beams, and a road boundary on the road is determined based on the target coordinates of the detection points. As can be seen that, according to the embodiments of the disclosure, the detection points on the road may be determined by using the detection device installed on the target vehicle, that is, the detection points may be determined without influence of outside conditions, such that the road boundary may be determined accurately based on the target coordinates of the detection points, to realize accurate detection of the road boundary.

It should be noted that an implementation of the step 103 in the embodiment is introduced via following steps 203 to 204 in the embodiment.

Figure 2:
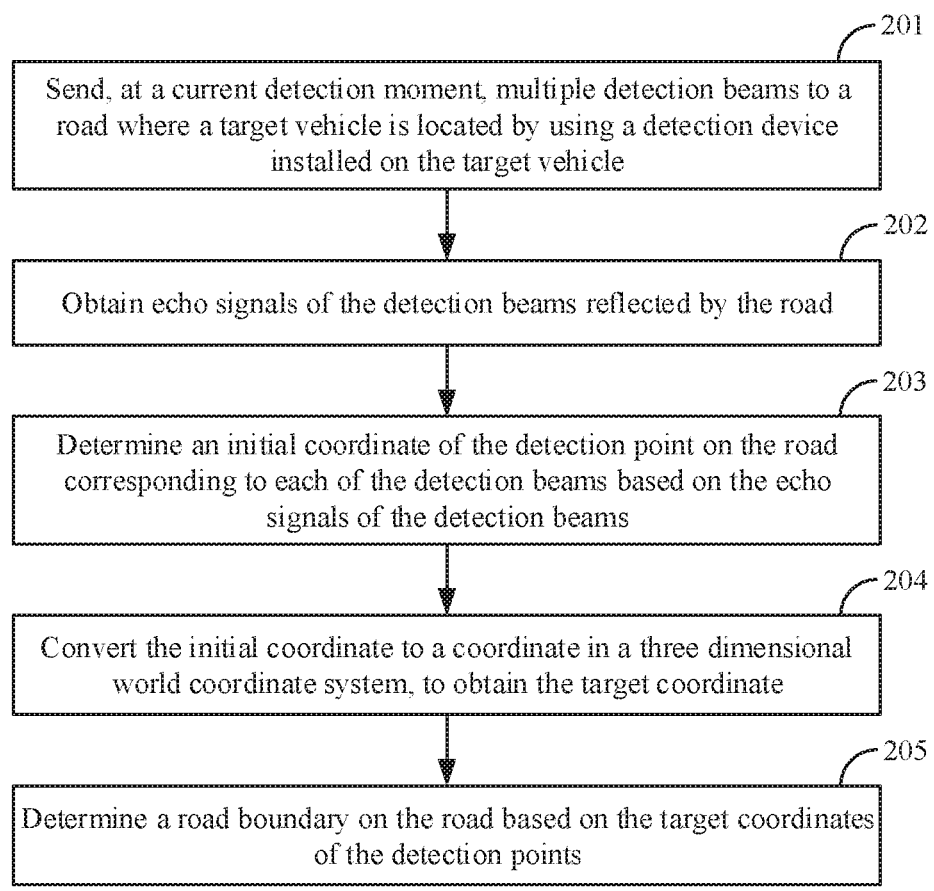
FIG. 2 is a flowchart of a method for detecting a road boundary according to another embodiment of the present disclosure.

FIG. 2 is a flowchart of a method for detecting a road boundary according to the embodiment. As shown in FIG. 2, the method for detecting the road boundary includes following steps 201 to 205.

In step 201, multiple detection beams are sent, at a current detection moment, to a road where a target vehicle is located by using a detection device installed on the target vehicle.

In step 202, echo signals of the detection beams reflected by the road are obtained.

It should be noted that the steps 201 to 202 are the same as the steps 101 to 102 in the embodiment respectively, one may refer to the description of the embodiment for a related part, which is not repeated herein.

In step 203, an initial coordinate of the detection point on the road corresponding to each of the detection beams is determined based on the echo signal of the detection beam.

In the embodiment, the initial coordinate of the detection point on the road corresponding to each of the detection beams may be determined based on the echo signal of the detection beam reflected by the road obtained in step 202.

The initial coordinate is a coordinate of the detection point in a detection coordinate system corresponding to the detection point. The detection coordinate system is a two dimensional coordinate system constructed on a plane where the detection beam corresponding to the detection point is located.

For example, take a laser radar sensor as the example of the detection device. At the current detection moment, the laser radar sensor sends detection signals (detection beams) to the road, then the laser radar sensor receives signals (echo signals) reflected by detection points on the road. After comparing the reflected signals with the sent detection signals, relevant information of each detection point, such as parameters including position of the detection point, may be obtained by proper process. Then the coordinate of each detection point in the detection coordinate system corresponding to the detection point, i.e., the initial coordinate, may be determined based on the parameters such as the position of each detection point.

In an implementation of the embodiment, origin of the detection coordinate system in step 203 is located on the detection device. One coordinate axis of the detection coordinate system (which may be X axis or Y axis) is superposed with the detection beam corresponding to the detection point and points to the ground.

Figure 3:
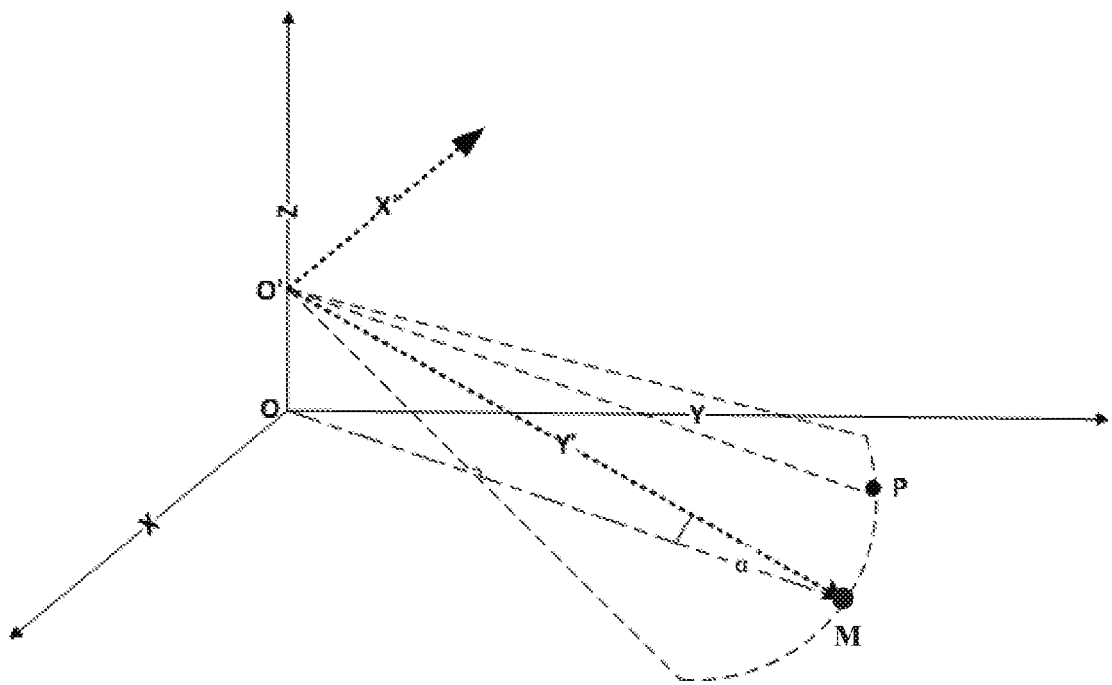
FIG. 3 is a schematic view of a detection coordinate system and a world coordinate system according to an embodiment of the present disclosure.

For example, as illustrated in FIG. 3, which is a schematic view of the detection coordinate system and a three-dimensional world coordinate system according to an embodiment of the present disclosure.

As illustrated in FIG. 3, point O' in FIG. 3 refers to the origin of the detection coordinate system, and locates on the detection device. The detection device is installed on the target vehicle depends on an actual situation. Beam Y' (dashed line) refers to one of the multiple detection beams sent to the road where the target vehicle is located by the detection device at the current detection moment. Detection point M is the detection point corresponding to the beam Y'. Other dashed lines adjacent to the beam Y' in FIG. 3 refer to the detection beams sent by the detection device to the road where the target vehicle is located at the current detection moment. These detection beams form a sector. The angle between the sector and the ground is α.

As illustrated in FIG. 3, Y axis of each detection coordinate system is superposed with corresponding detection beam and points to the ground. Correspondingly, X axis of the detection coordinate system is perpendicular to the Y axis of the detection coordinate system. Take the detection point M in FIG. 3 as an example, Y axis of the detection coordinate system corresponding to the detection point M is superposed with the detection beam Y' corresponding to the detection point M, and points to the ground. Dashed line X' sent from point O' is perpendicular to the beam Y', and points to upward side of the sector. Then, two dimensional coordinate system X'O'Y' is the detection coordinate system corresponding to the detection point M, and two dimensional coordinate of the point M in the coordinate system X'O'Y' is the initial coordinate of the point M.

It can be seen that the initial coordinate of the detection point on the road corresponding to each detection beam, i.e., the two dimensional coordinate of the detection point in the detection coordinate system corresponding to the detection point, can be determined via the two dimensional coordinate system constructed on the plane where the detection beam corresponding to the detection point is located. Then step 204 may be performed.

In step 204, the initial coordinate is converted to a coordinate in a three dimensional world coordinate system, to obtain the target coordinate.

In the embodiment, the initial coordinate of the detection point on the road corresponding to each detection beam, i.e., the coordinate of the detection point in the detection coordinate system corresponding to the detection point, may be determined in step 203. Since the detection points correspond to different detection coordinate systems, it can be understood that in order to detect the road boundary based on the coordinate of each detection point later, coordinate conversion should be performed on the coordinate of each detection point, such that the detection points may be projected into the same coordinate system, to determine the target coordinates of the detection points on the road corresponding to the detection beams in the same coordinate system.

In the embodiment, the initial coordinate of each detection point is converted to the coordinate in three dimensional world coordinate system, to obtain the target coordinate of each detection point in the three dimensional world coordinate system. That is to say, the target coordinate of the detection point in the embodiment refer to the coordinate of the detection point in the three dimensional world coordinate system. For example, the two dimensional coordinate of the detection point M in FIG. 3 may be converted to a three dimensional coordinate in the three dimensional world coordinate system, i.e., a coordinate on X axis, Y axis and Z axis. Suppose that the detection point M is on the ground, and then the coordinate of M on the Z axis is zero.

In an implementation of the embodiment, origin of the three dimensional world coordinate system in the above step 204 locates on surface of the road, and locates on a predetermined position with respect to the detection device. Two coordinate axes of the three dimensional world coordinate system locate on the surface of the road. In one embodiment, the X axis and the Y axis of the three dimensional world coordinate system locate on the surface of the road, the Z axis of the three dimensional coordinate system is perpendicular to the X axis and Y axis of the three dimensional world coordinate system.

For example, take FIG. 3 as the example, as illustrated in FIG. 3, point O refers to the origin of the three dimensional world coordinate system. Point O locates on the surface of the road and locates on a predetermined position with respect to the detection device. As illustrated in FIG. 3, the X axis and the Y axis of the three dimensional world coordinate system locate on the surface of the road, the Z axis is perpendicular to the X axis and Y axis of the three dimensional world coordinate system. A direction of the X axis may be perpendicular to a traveling direction of the vehicle, and a direction of the Y axis may be the same as the traveling direction of the vehicle. The origin O of the three dimensional world coordinate system and the origin O' of the detection coordinate system both can locate on a direction of Z axis. There is a certain distance between the origin O and the origin O'. As illustrated in FIG. 3, each detection point may be projected into the three dimensional world coordinate system XOY. The initial coordinate of each detection point is converted to the coordinate in the three dimensional world coordinate system, to obtain the target coordinate, which may be used to in step 205.

It should be noted that, in addition to the above construction way, the detection coordinate system and the three dimensional world coordinate system may be constructed in other way. For example, the direction of the coordinate system may be changed, or the position of the origin may be changed, which is not limited in the embodiment.

In step 205, a road boundary on the road is determined based on the target coordinates of the detection points.

It should be noted that the step 205 is the same as the step 104 in the embodiment, one may refer to the description of the embodiment for a related part, which is not repeated herein.

The method for detecting a road boundary according to the embodiment of the present disclosure is described as follows. Multiple detection beams are sent, at a current detection moment, to a road where a target vehicle is located by using a detection device installed on the target vehicle. Echo signals of the detection beams reflected by the road are obtained. An initial coordinate of the detection point on the road corresponding to each of the detection beams is determined based on the echo signal of the detection beam, the initial coordinate is a coordinate of the detection point in a detection coordinate system corresponding to the detection point, the detection coordinate system is a two dimensional coordinate system constructed on a plane where the detection beam corresponding to the detection point is located. The initial coordinate is converted to a coordinate in a three dimensional world coordinate system, to obtain the target coordinate. A road boundary on the road is determined based on the target coordinates of the detection points. As can be seen that, according to the embodiment of the disclosure, the detection points on the road may be determined by using the detection device installed on the target vehicle, the target coordinates of the detection points are obtained by performing the coordinate conversion on the coordinates of the detection points, and the road boundary is determined accurately based on the target coordinates, to realize accurate detection of the road boundary without influence of outside conditions.

It should be noted that an implementation of the step 104 in the embodiment is introduced via following steps 404 to 405 in the embodiment.

Figure 4:
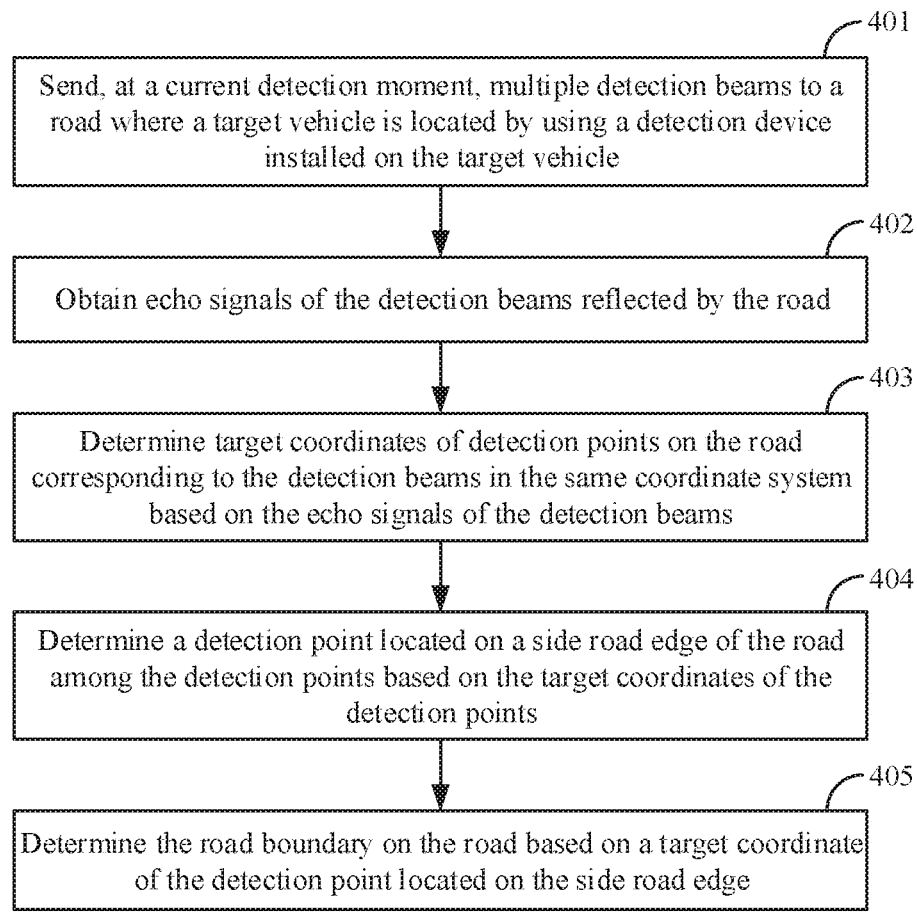
FIG. 4 is a flowchart of a method for detecting a road boundary according to another embodiment of the present disclosure.

FIG. 4 is a flowchart of a method for detecting a road boundary according to the embodiment. The method for detecting a road boundary includes following steps 401 to 405.

In step 401, multiple detection beams are sent, at a current detection moment, to a road where a target vehicle is located by using a detection device installed on the target vehicle.

In step 402, echo signals of the detection beams reflected by the road are obtained.

In step 403, target coordinates of detection points on the road corresponding to the detection beams in the same coordinate system are determined based on the echo signals of the detection beams.

It should be noted that the step 401 to 403 are the same as the steps 101 to 103 in the embodiment, one may refer to the description of the embodiment for a related part, which is not repeated herein. Of course, the step 403 may be replaced by steps 203 to 204 or specific implementations of steps 203 to 204 in the embodiment, one may refer to the description of the embodiment for a related part, which is not repeated herein.

In step 404, a detection point located on a side road edge of the road among the detection points is determined based on the target coordinates of the detection points.

In practice, after the target coordinates of the detection points on the road corresponding to the detection beams in the same coordinate system are determined in step 403, the detection point located on the side road edge of the road among the detection points may be determined based on the target coordinates of the detection points.

The detection point located on the side road edge refers to a detection point with a coordinate on the Z axis (as shown in FIG. 3) of the three dimensional world coordinate system greater than zero after coordinate conversion. After determining the detection point located on the side road edge, step 405 may be performed.

In step 405, the road boundary on the road is determined based on a target coordinate of the detection point located on the side road edge.

In the embodiment, after the detection point located on the side road edge of the road is determined in step 404, road boundary information on the road may be determined based on the target coordinate of the detection point located on the side road edge.

In an implementation of the embodiment, the side road edge is a left side road edge or a right side road edge, and the step 405 may be implemented as follows. The road boundary on the road is determined based on the target coordinates of the detection points located on the side road edge, in case that the number of the detection points located on the side road edge is greater than or equal to three.

In the implementation, the side road edge is a left side road edge or a right side road edge. If the number of the detection points located on the left side road edge determined in step 404 is greater than or equal to three, a left side road boundary on the road may be determined based on determined target coordinates of the detection points located on the left side road edge. Similarly, if the number of the detection points located on the right side road edge determined in step 404 is greater than or equal to three, a right side road boundary on the road may be determined based on the determined target coordinates of the detection points located on the right side road edge.

Figure 5:
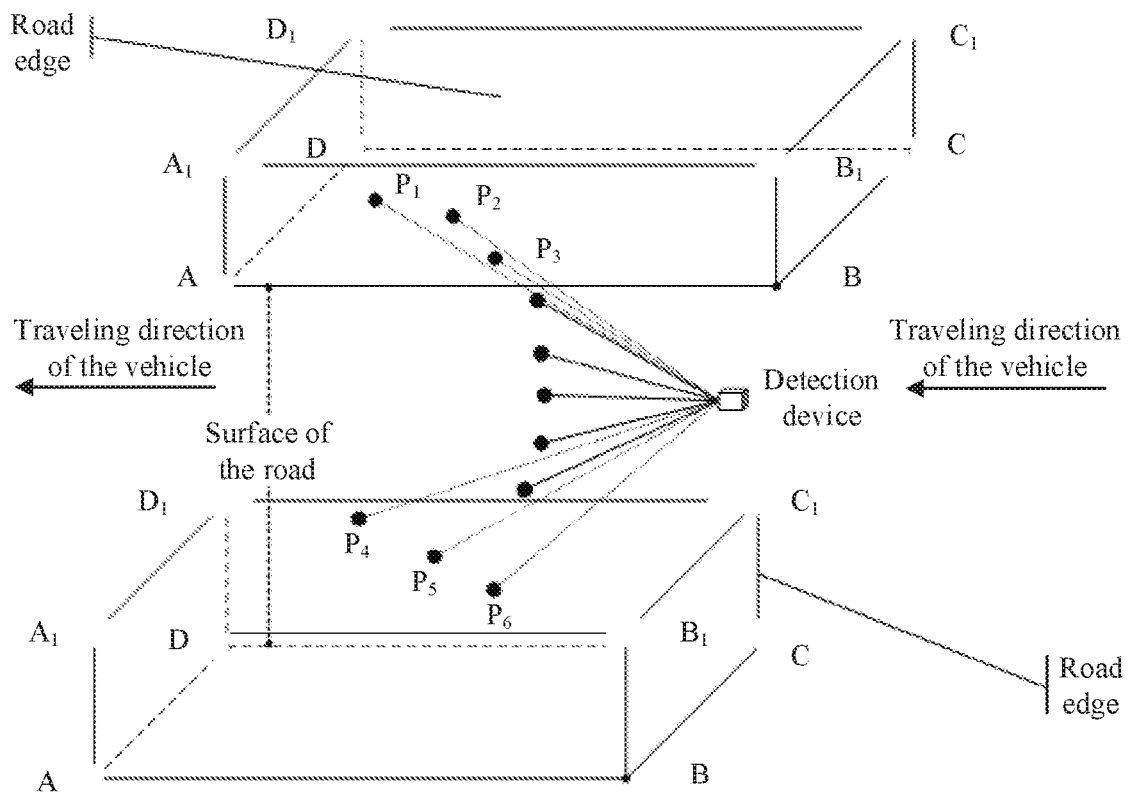
FIG. 5 is a schematic view of detection points located on a side road edge according to an embodiment of the present disclosure.

FIG. 5 is a schematic view of the detection points located on the side road edge of the road according to the embodiment of the present disclosure. As illustrated in FIG. 5, the detection device installed on the target vehicle sends the multiple detection beams to the road where the target vehicle is located at the current detection moment. Then, suppose that it is determined based on the echo signals of the detection beams reflected by the road that six detection beams sent to the side road edge of the road include three detection beams which are sent to the left side road edge and three detection beams which are sent to the right side road edge. The detection points on the two side road edges may be determined as $P_1$, $P_2$, $P_3$, $P_4$, $P_5$, and $P_6$. $P_1$, $P_2$, and $P_3$ locate on one side road edge, and $P_4$, $P_5$, and $P_6$ locate on the other side road edge. Further, one side road edge boundary of the road may be determined based on the target coordinates of the detection points $P_1$, $P_2$ and $P_3$ in the three dimensional world coordinate system. Similarly, the other side road edge boundary of the road may be determined based on the target coordinates of the detection points $P_4$, $P_5$, and $P_6$ in the three dimensional world coordinate system.

It should be noted that it is possible to detect only one side road edge boundary or two side road edge boundaries at the same time, depending on an actual requirement or whether a detection condition is allowed.

In the above implementation, if the number of the detection points located on the side road edge is greater than or equal to three, any one of following two implementation manners can be adopted. That is, the road boundary on the road may be determined based on the target coordinates of the detection points located on the side road edge. The two implementation manners are introduced as follows.

In a first implementation manner, the determining the road boundary on the road based on the target coordinates of the detection points located on the side road edge includes step A, step B and step C.

In step A, at least three detection points located on the side road edge is taken as road edge detection points.

In step B, polynomial fitting is performed based on the target coordinates of the road edge detection points, to obtain a fitting polynomial corresponding to the current detection moment.

In step C, road boundary information of the road is generated based on the fitting polynomial corresponding to the current detection moment.

In the embodiment, if it is determined that the number of the detection points located on the side road edge is greater than or equal to three, the at least three detection points located on the side road edge may be taken as the road edge detection points. Then, the polynomial fitting is performed based on the target coordinates of the road edge detection points, i.e., coordinates of the road edge detection points in the three dimensional world coordinate system, to obtain the fitting polynomial corresponding to the current detection moment. The road boundary information of the road may be generated based on the fitting polynomial corresponding to the current detection moment.

In the implementation, an adopted polynomial fitting equation is as follows.

$$f(x) = a_0 + a_1 x + a_2 x^2 + a_3 x^3 + \ldots + a_j x^j = a_0 + \sum_{k=1}^{j} a_k x^k$$

f(x) represents coordinate of the road edge detection point on a first coordinate axis of the three dimensional world coordinate system. x represents coordinate of the road edge detection point on a second coordinate axis of the three dimensional world coordinate system. The first coordinate axis is a coordinate axis superposed with a traveling direction of the target vehicle (such as the Y axis illustrated in FIG. 3). The second coordinate axis is a coordinate axis perpendicular to the traveling direction of the target vehicle (such as the X axis illustrated in FIG. 3). $a_0, a_1, \ldots, a_j$ represent parameters of the curve equation which can be obtained by a way of solving equation group, $j \geq 2$.

For example, take FIG. 5 as the example, supposing that the number of the determined detection points located on the side road edge of the road is six. $P_1$, $P_2$, and $P_3$ locate on one side road edge, and $P_4$, $P_5$, and $P_6$ locate on the other side road edge. The coordinates of $P_1$, $P_2$, $P_3$, $P_4$, $P_5$, and $P_6$ in the three dimensional world coordinate system are $(x_1, y_1, z_1)$, $(x_2, y_2, z_2)$, $(x_3, y_3, z_3)$, $(x_4, y_4, z_4)$, $(x_5, y_5, z_5)$, $(x_6, y_6, z_6)$ respectively. Then the polynomial fitting may be performed based on the coordinates of two group detection points $P_1$, $P_2$, $P_3$, and $P_4$, $P_5$, $P_6$, to obtain two fitting polynomials corresponding to current detection moment. After bringing each coordinate into the above polynomial fitting equation, the following equation groups may be obtained.

$$\begin{cases} y_1 = a_0 + a_1 x_1 + a_2 x_1^2 \\ y_2 = a_0 + a_1 x_2 + a_2 x_2^2 \\ y_3 = a_0 + a_1 x_3 + a_2 x_3^2 \end{cases} \quad \text{equation group (1)}$$

$$\begin{cases} y_4 = a_0' + a_1' x_4 + a_2' x_4^2 \\ y_5 = a_0' + a_1' x_5 + a_2' x_5^2 \\ y_6 = a_0' + a_1' x_6 + a_2' x_6^2 \end{cases} \quad \text{equation group (2)}$$

$a_0$, $a_1$, $a_2$, $a_0'$, $a_1'$, $a_2'$ represent parameters of polynomial fitting, which can be obtained by solving the above equation group (1) and equation group (2).

Further, expressions of boundary curves on both sides of the road may be obtained as follows.

$$f_1(x) = a_0 + a_1 x + a_2 x^2$$

$$f_2(x) = a_0' + a_1' x + a_2' x^2$$

$f_1(x)$ represents one side road boundary curve including the detection points $P_1$, $P_2$, and $P_3$. Correspondingly, $f_2(x)$ represents the other side road boundary curve including the detection points $P_4$, $P_5$, and $P_6$.

It can be seen that in the implementation, after determining the road edge detection points, polynomial fitting may be performed on the target coordinates of the road edge detection points. The road boundary information of the road may be generated based on the fitting polynomial corresponding to the current detection moment.

In a second implementation manner, the determining the road boundary on the road based on the target coordinates of the detection points located on the side road edge includes step D, step E, step F and step G.

In step D, at least three detection points located on the side road edge is taken as road edge detection points.

In step E, polynomial fitting is performed based on the target coordinates of the road edge detection points, to obtain a fitting polynomial corresponding to the current detection moment.

In step F, the fitting polynomial corresponding to the current detection moment is revised based on a fitting polynomial corresponding to the last detection moment.

In step G, road boundary information of the road is generated based on the revised fitting polynomial.

In the embodiment, if it is determined that the number of the detection points located on the side road edge of the road is greater than or equal to three, the at least three detection points located on the side road edge may be taken as the road edge detection points. Then, the polynomial fitting is performed based on the target coordinates of the road edge detection points, i.e., coordinates of the road edge detection points in the three dimensional world coordinate system, to obtain the fitting polynomial corresponding to the current detection moment. One may refer to the first implementation manner for the specific fitting implementation.

In the above step F, in order to ensure that the generated road boundary curve may be outputted accurately and continuously, the fitting polynomial corresponding to the current detection moment may be revised based on the fitting polynomial corresponding to the last detection moment. The road boundary information of the road may be generated based on the revised fitting polynomial.

In one embodiment, "revising the fitting polynomial corresponding to the current detection moment" in step F may specifically include revising the fitting polynomial corresponding to the current detection moment based on classical Kalman filtering algorithm. The revising process is introduced specifically in conjunction with FIG. 6 in the following.

Taking a case that the number of the road edge detection points on one side road edge at the current detection moment is three as an example, a polynomial fitting is performed based on the target coordinates of the three road edge detection points, to generate the following curve equation of a road boundary curve.

$$f(x)=a_0+a_1x+a_2x^2$$

$a_0$, $a_1$, and $a_2$ represent parameters of the polynomial fitting, which may be obtained by solving the above equation group (1).

Figure 6:
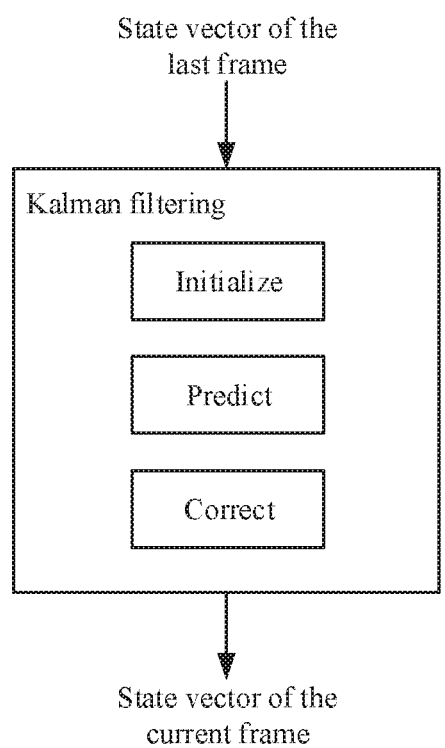
FIG. 6 is a schematic view of revising a fitting polynomial by using Kalman filtering according to an embodiment of the present disclosure.

Kalman filtering algorithm is a kind of algorithm for performing optimal estimation on a system state by using a linear system state equation based on input and output observation data of the system. Therefore, a last frame state vector, i.e., a state vector corresponding to the last detection moment, such as $[b_0, b_1, b_2]$, may be inputted to a Kalman filter model. As illustrated in FIG. 6, after Kalman filtering, a state vector, such as $[c_0, c_1, c_2]$, obtained by revising a current frame state vector $[a_0, a_1, a_2]$ is outputted.

A specific formula of Kalman filtering algorithm is as follows $$x_t=A_t x_{t-1}+B_t u_{t-1}+\varepsilon_{t-1}$$

$$z_t=C_t x_t+\delta_t$$

$X_t$ is a state vector $[a_0, a_1, a_2]$ corresponding to moment t (i.e., the current detection moment). $x_{t-1}$ is a state vector corresponding to moment t−1 (i.e., the last detection moment), i.e., $[b_0, b_1, b_2]$. $U_{t-1}$ is a control quantity to the system at the moment t−1 (since the system may have no control quantity, so the control quantity may be zero). $A_t$ and $B_t$ are system parameters at moment t. $C_t$ is a measured parameter at moment t. $\varepsilon_{t-1}$ and $\delta_t$ are a process noise of the moment t−1 and an observation noise of the moment t respectively. $Z_t$ is a measured value at moment t, i.e., the state vector $[c_0, c_1, c_2]$ obtained by revising $[a_0, a_1, a_2]$.

"Initialize" in the Kalman filtering algorithm in FIG. 6 refers to that Kalman filtering parameters are initialized. "Predict" refers to that an error of the state vector $[a_0, a_1, a_2]$ at the current detection moment is predicted. "Correct" refers to that an optimal value $[c_0, c_1, c_2]$ of the state vector at the current detection amount is calculated. Therefore, the more accurate state vector of the current frame obtained by revising using Kalman filtering, i.e., the revised state vector $[c_0, c_1, c_2]$ corresponding to the current detection moment, may be outputted. Then the revised curve equation of the road boundary curve may be obtained as $f(x)=c_0+c_1x+c_2x^2$ In the embodiment, the fitting polynomial corresponding to the current detection moment is revised based on the classical Kalman filtering algorithm, which guarantees that the generated road boundary curve may be outputted accurately and continuously.

Therefore, in the embodiment, after the detection points located on the side road edge of the road are determined based on the target coordinates of the detection points, the polynomial fitting may be performed to the target coordinates of the road edge detection points, to obtain the fitting polynomial corresponding to the current detection moment. Then the fitting polynomial is revised by using Kalman filtering, more accurate road boundary information may be generated. In this way, the accurate detection of the road boundary is realized without the influence of outside conditions.

Figure 7A:
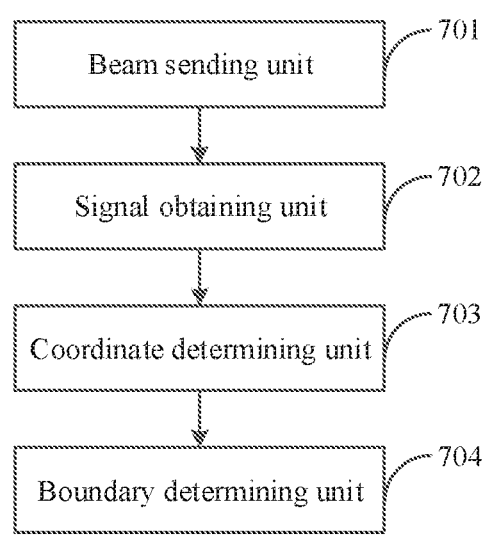
FIG. 7A is a schematic structural view of a device for detecting a road boundary according to an embodiment of the present disclosure.

Reference is made to FIG. 7A, which is a schematic structural view of a device for detecting a road boundary according to the embodiment. The device for detecting a road boundary includes a beam sending unit 701, a signal obtaining unit 702, a coordinate determining unit 703 and a boundary determining unit 704.

The beam sending unit 701 is configured to send, at a current detection moment, multiple detection beams to a road where a target vehicle is located by using a detection device installed on the target vehicle.

The signal obtaining unit 702 is configured to obtain echo signals of the detection beams reflected by the road.

The coordinate determining unit 703 is configured to determine target coordinates of detection points on the road corresponding to the detection beams in the same coordinate system based on the echo signals of the detection beams.

The boundary determining unit 704 is configured to determine a road boundary on the road based on the target coordinates of the detection points.

Figure 7B:
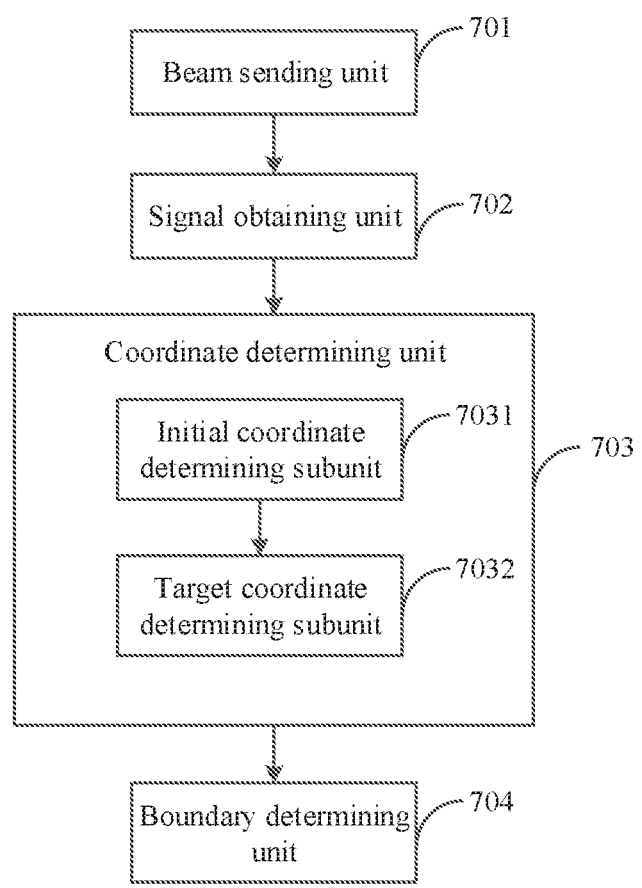
FIG. 7B is a schematic structural view of a device for detecting a road boundary according to another embodiment of the present disclosure.

In an implementation of the embodiment, as illustrated in FIG. 7B, the coordinate determining unit 703 includes an initial coordinate determining subunit 7031 and a target coordinate determining subunit 7032.

The initial coordinate determining subunit 7031 is configured to determine an initial coordinate of the detection point on the road corresponding to each of the detection beams. The initial coordinate is a coordinate of the detection point in a detection coordinate system corresponding to the detection point, the detection coordinate system is a two dimensional coordinate system constructed on a plane where the detection beam corresponding to the detection point is located.

The target coordinate determining subunit 7032 is configured to convert the initial coordinate to a coordinate in a three dimensional world coordinate system, to obtain the target coordinate.

Figure 7C:
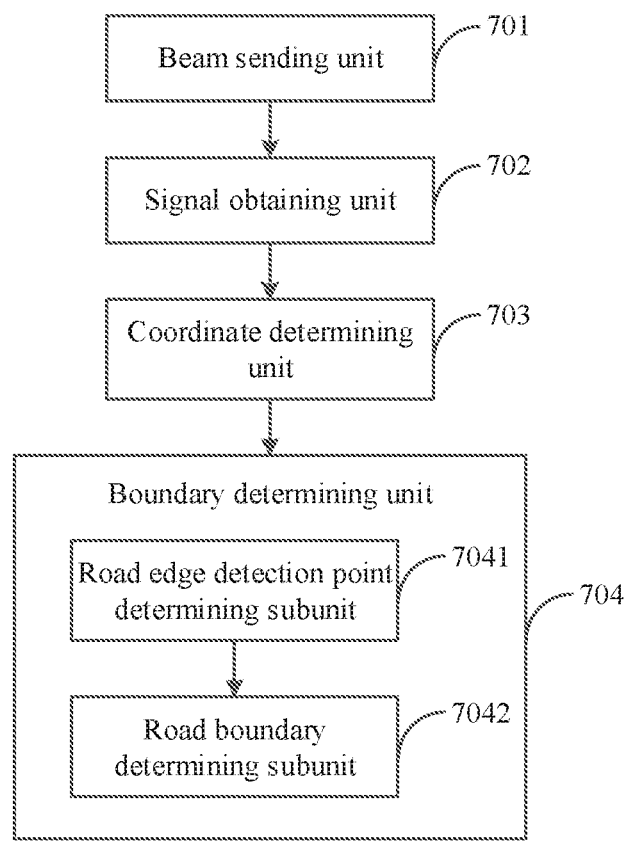
FIG. 7C is a schematic structural view of a device for detecting a road boundary according to another embodiment of the present disclosure.

In an implementation of the embodiment, as illustrated in FIG. 7C, the boundary determining unit 704 includes a road edge detection point determining subunit 7041 and a road boundary determining subunit 7042.

The road edge detection point determining subunit 7041 is configured to determine a detection point located on a side road edge of the road among the detection points based on the target coordinates of the detection points.

The road boundary determining subunit 7042 is configured to determine the road boundary on the road based on a target coordinate of the detection point located on the side road edge.

In an implementation of the embodiment, the side road edge is a left side road edge or a right side road edge. The road boundary determining subunit 7042 is configured to: determine the road boundary on the road based on the target coordinates of the detection points located on the side road edge, in case that the number of the detection points located on the side road edge is greater than or equal to three.

Figure 7D:
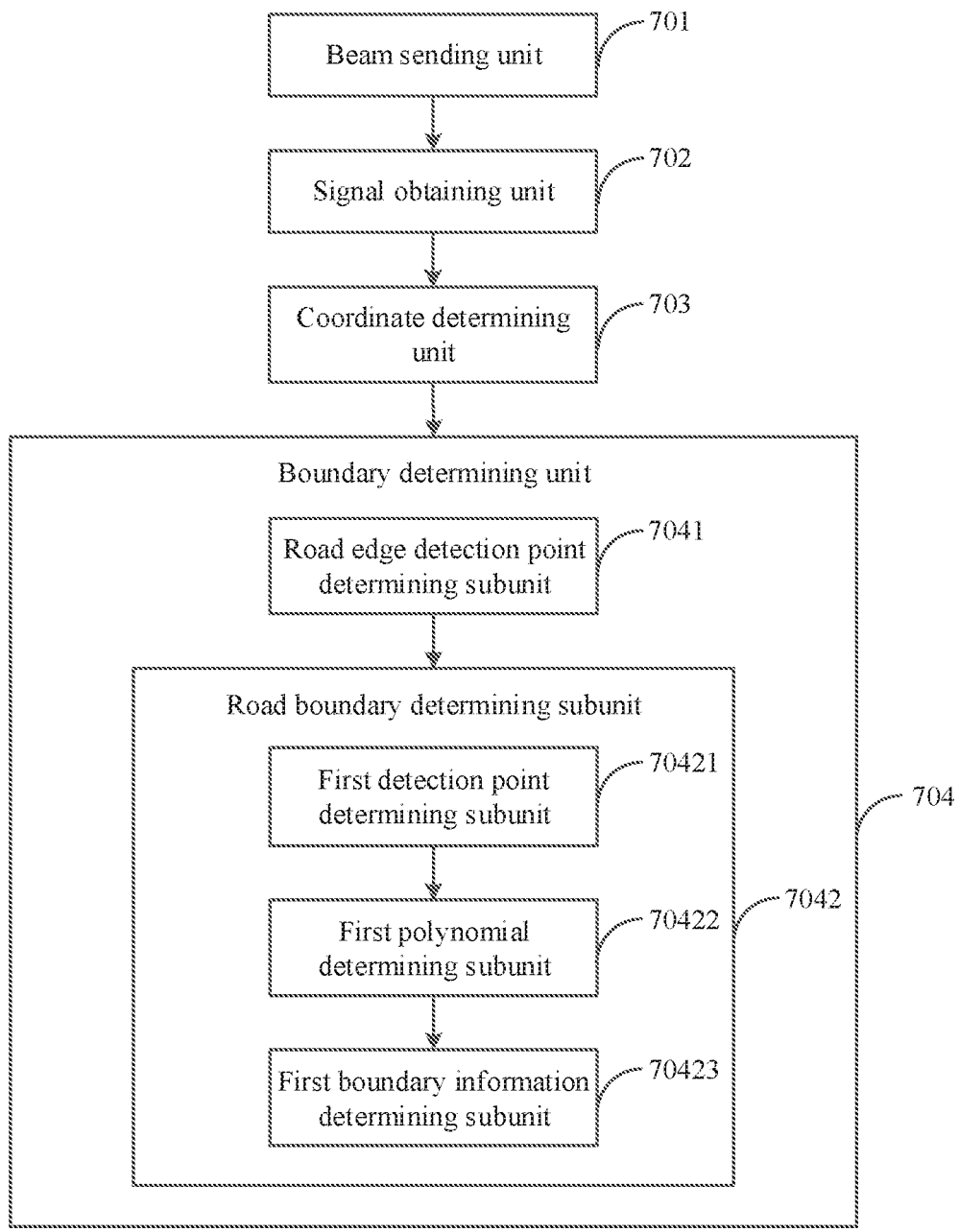
FIG. 7D is a schematic structural view of a device for detecting a road boundary according to another embodiment of the present disclosure.

In an implementation of the embodiment, as illustrated in FIG. 7D, the road boundary determining subunit 7042 includes a first detection point determining subunit 70421, a first polynomial determining subunit 70422 and a first boundary information determining subunit 70423.

The first detection point determining subunit 70421 is configured to take at least three detection points located on the side road edge as road edge detection points.

The first polynomial determining subunit 70422 is configured to perform polynomial fitting based on the target coordinates of the road edge detection points, to obtain a fitting polynomial corresponding to the current detection moment.

The first boundary information determining subunit 70423 is configured to generate road boundary information of the road based on the fitting polynomial corresponding to the current detection moment.

Figure 7E:
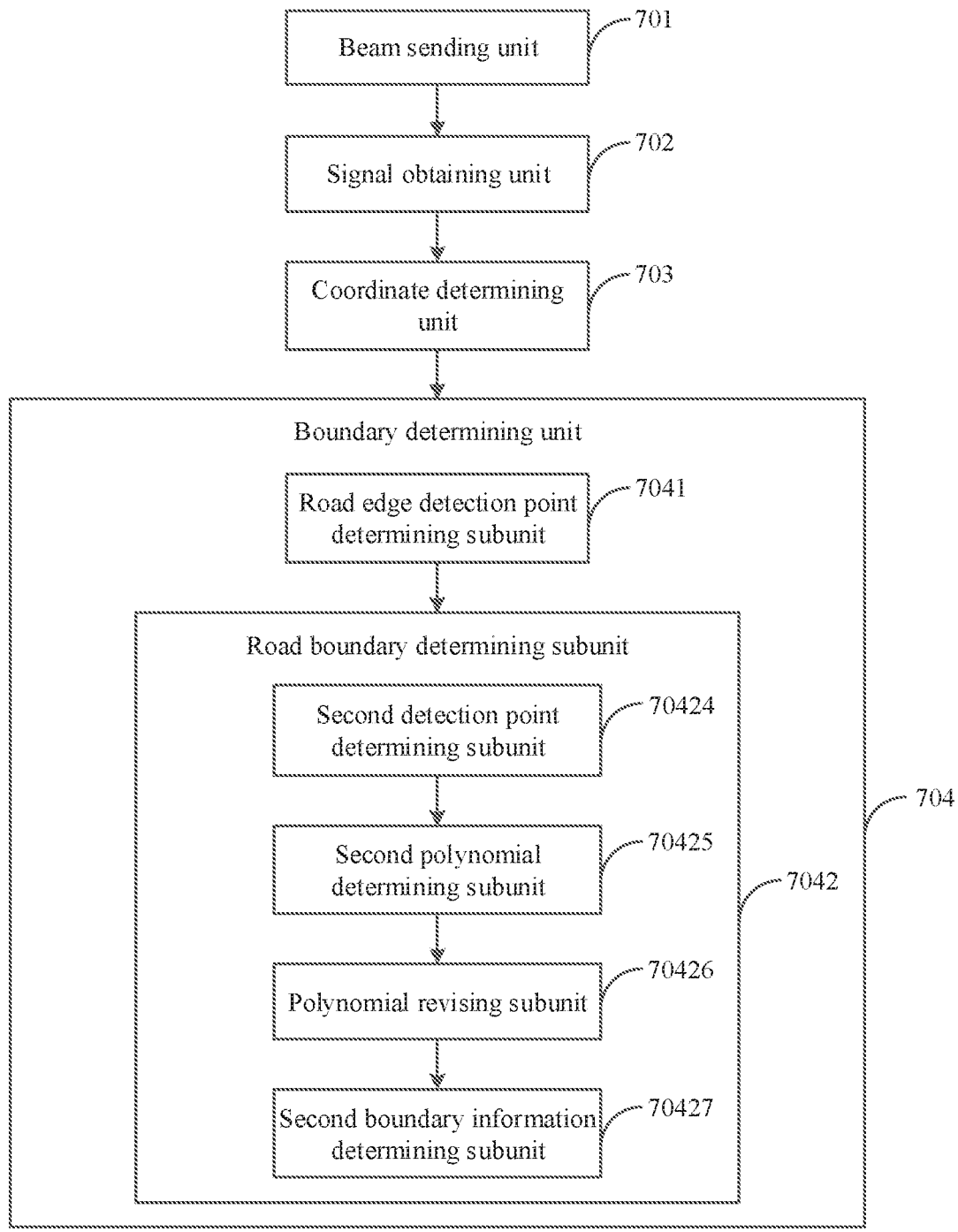
FIG. 7E is a schematic structural view of a device for detecting a road boundary according to another embodiment of the present disclosure.

In an implementation of the embodiment, as illustrated in FIG. 7E, the road boundary determining subunit 7042 includes a second detection point determining subunit 70424, a second polynomial determining subunit 70425, a polynomial revising subunit 70426 and a second boundary information determining subunit 70427.

The second detection point determining subunit 70424 is configured to take at least three detection points located on the side road edge as road edge detection points.

The second polynomial determining subunit 70425 is configured to perform polynomial fitting based on the target coordinates of the road edge detection points, to obtain a fitting polynomial corresponding to the current detection moment.

The polynomial revising subunit 70426 is configured to revise the fitting polynomial corresponding to the current detection moment based on a fitting polynomial corresponding to the last detection moment.

The second boundary information determining subunit 70427 is configured to generate road boundary information of the road based on the revised fitting polynomial.

Figure 8:
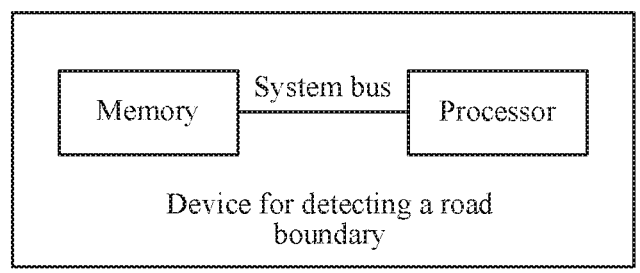
FIG. 8 is a schematic structural view of a device for detecting a road boundary according to another embodiment of the present disclosure.

Furthermore, as shown in FIG. 8, a device for detecting a road boundary is provided according to an embodiment of the disclosure. The device includes a processor, a memory and a system bus. The processor and the memory are connected by the system bus. The memory is configured to store one or more programs. The one or more programs include instructions, when executed by the processor, causing the processor to perform any one of the above methods.

Furthermore, a computer readable storage medium is provided according to an embodiment of the disclosure. The computer readable storage medium stores instructions, when executed on a terminal device, causing the terminal device to perform any one of the above methods.

Furthermore, a computer program product is provided according to an embodiment of the disclosure. The computer program product, when run on a terminal device, causes the terminal device to perform any one of the above methods.

The software product may be stored in a storage medium, such as a ROM/RAM, a magnetic disk, and an optic disk, and include multiple instructions so as to make a computer device (which may be a personal computer, a server, or a communication device such as a media gateway) perform the method described in each embodiment or some parts of the embodiments of the present disclosure.

It should be further noted that, the relationship terms such as "first", "second" and the like are only used herein to distinguish one entity or operation from another, rather than to necessitate or imply that an actual relationship or order exists between the entities or operations. Furthermore, the terms such as "include", "comprise" or any other variants thereof means to be non-exclusive. Therefore, a process, a method, an article or a device including a series of elements include not only the disclosed elements but also other elements that are not clearly enumerated, or further include inherent elements of the process, the method, the article or the device. Unless expressively limited, the statement "including a . . . " does not exclude the case that other similar elements may exist in the process, the method, the article or the device other than enumerated elements.

The invention claimed is:

1. A method for detecting a road boundary, the method comprising:
sending, at a current detection moment and by a detection device installed on a target vehicle, a plurality of detection beams to a road where the target vehicle is located, wherein the plurality of detection beams sent by the detection device present as a sector, the detection beams are located at different layers in a sector area and are sent to different detection points on the road, the detection beams are reflected by the detection points on the road to generate echo signals;
obtaining the echo signals of the detection beams reflected by the road;
determining target coordinates of the detection points on the road corresponding to the detection beams in a same coordinate system based on the echo signals of the detection beams; and
determining a road boundary on the road based on the target coordinates of the detection points,
wherein the determining target coordinates of the detection points on the road corresponding to the detection beams in a same coordinate system comprises:
determining an initial coordinate of the detection point on the road corresponding to each of the detection beams, wherein the initial coordinate is a coordinate of the detection point in a detection coordinate system corresponding to the detection point, the detection coordinate system is a two dimensional coordinate system constructed on a plane where the detection beam corresponding to the detection point is located; and
converting the initial coordinate to a coordinate in a three dimensional world coordinate system by projecting each detection point in the detection coordinate system into the three dimensional world coordinate system, to obtain the target coordinate.

2. The method according to claim 1, wherein the determining a road boundary on the road based on the target coordinates of the detection points comprises:
determining a detection point located on a side road edge of the road among the detection points based on the target coordinates of the detection points; and
determining the road boundary on the road based on a target coordinate of the detection point located on the side road edge.

3. The method according to claim 2, wherein the side road edge is a left side road edge or a right side road edge, and the determining the road boundary on the road based on a target coordinate of the detection point located on the side road edge comprises:
determining the road boundary on the road based on the target coordinates of the detection points located on the side road edge, in case that the number of the detection points located on the side road edge is greater than or equal to three.

4. The method according to claim 3, wherein the determining the road boundary on the road based on the target coordinates of the detection points located on the side road edge comprises:
taking at least three detection points located on the side road edge as road edge detection points;
performing polynomial fitting based on the target coordinates of the road edge detection points, to obtain a fitting polynomial corresponding to the current detection moment; and
generating road boundary information of the road based on the fitting polynomial corresponding to the current detection moment.

5. The method according to claim 3, wherein the determining the road boundary on the road based on the target coordinates of the detection points located on the side road edge comprises:

taking at least three detection points located on the side road edge as road edge detection points;

performing polynomial fitting based on the target coordinates of the road edge detection points, to obtain a fitting polynomial corresponding to the current detection moment;

revising the fitting polynomial corresponding to the current detection moment based on a fitting polynomial corresponding to the last detection moment; and generating road boundary information of the road based on the revised fitting polynomial.

6. A device for detecting a road boundary, the device comprising a processor, a memory for storing program instructions, and a system bus, wherein the processor and the memory are connected via the system bus, and the processor executes the program instructions to:

send, at a current detection moment and by a detection device installed on a target vehicle, a plurality of detection beams to a road where the target vehicle is located, wherein the plurality of detection beams sent by the detection device present as a sector, the detection beams are located at different layers in a sector area and are sent to different detection points on the road, the detection beams are reflected by the detection points on the road to generate echo signals;

obtain the echo signals of the detection beams reflected by the road;

determine target coordinates of the detection points on the road corresponding to the detection beams in the same coordinate system based on the echo signals of the detection beams; and determine a road boundary on the road based on the target coordinates of the detection points, wherein the processor executes the program instructions further to:

determine an initial coordinate of the detection point on the road corresponding to each of the detection beams, wherein the initial coordinate is a coordinate of the detection point in a detection coordinate system corresponding to the detection point, the detection coordinate system is a two dimensional coordinate system constructed on a plane where the detection beam corresponding to the detection point is located; and convert the initial coordinate to a coordinate in a three dimensional world coordinate system by projecting each detection point in the detection coordinate system into the three dimensional world coordinate system, to obtain the target coordinate.

7. The device according to claim 6, wherein the processor executes the program instructions further to:

determine a detection point located on a side road edge of the road among the detection points based on the target coordinates of the detection points; and determine the road boundary on the road based on a target coordinate of the detection point located on the side road edge.

8. The device according to claim 7, wherein the side road edge is a left side road edge or a right side road edge, and wherein the processor executes the program instructions further to:

determine the road boundary on the road based on the target coordinates of the detection points located on the side road edge, in case that the number of the detection points located on the side road edge is greater than or equal to three.

9. The device according to claim 8, wherein the processor executes the program instructions further to:

take at least three detection points located on the side road edge as road edge detection points;

perform polynomial fitting based on the target coordinates of the road edge detection points, to obtain a fitting polynomial corresponding to the current detection moment; and generate road boundary information of the road based on the fitting polynomial corresponding to the current detection moment.

10. The device according to claim 8, wherein the processor executes the program instructions further to:

take at least three detection points located on the side road edge as road edge detection points;

perform polynomial fitting based on the target coordinates of the road edge detection points, to obtain a fitting polynomial corresponding to the current detection moment;

revise the fitting polynomial corresponding to the current detection moment based on a fitting polynomial corresponding to the last detection moment; and generate road boundary information of the road based on the revised fitting polynomial.

11. A computer readable storage medium storing instructions, when executed on a terminal device, causing the terminal device to:

send, at a current detection moment and by a detection device installed on a target vehicle, a plurality of detection beams to a road where the target vehicle is located, wherein the plurality of detection beams sent by the detection device present as a sector, the detection beams are located at different layers in a sector area and are sent to different detection points on the road, the detection beams are reflected by the detection points on the road to generate echo signals;

obtain the echo signals of the detection beams reflected by the road;

determine target coordinates of the detection points on the road corresponding to the detection beams in a same coordinate system based on the echo signals of the detection beams; and determine a road boundary on the road based on the target coordinates of the detection points, determine an initial coordinate of the detection point on the road corresponding to each of the detection beams, wherein the initial coordinate is a coordinate of the detection point in a detection coordinate system corresponding to the detection point, the detection coordinate system is a two dimensional coordinate system constructed on a plane where the detection beam corresponding to the detection point is located; and convert the initial coordinate to a coordinate in a three dimensional world coordinate system by projecting each detection point in the detection coordinate system into the three dimensional world coordinate system, to obtain the target coordinate.

\* \* \* \* \*